United States Patent
Wu et al.

(10) Patent No.: US 12,235,800 B2
(45) Date of Patent: Feb. 25, 2025

(54) DEFRAG LEVELS TO REDUCE DATA LOSS

(71) Applicant: Micron Technology, Inc., Boise, ID (US)

(72) Inventors: Minjian Wu, Shanghai (CN); Hui Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/979,190

(22) Filed: Nov. 2, 2022

(65) Prior Publication Data
US 2024/0143552 A1 May 2, 2024

(51) Int. Cl.
*G06F 16/00* (2019.01)
*G06F 3/00* (2006.01)
(Continued)

(52) U.S. Cl.
CPC ........ *G06F 16/1724* (2019.01); *G06F 3/0608* (2013.01); *G06F 3/0619* (2013.01); *G06F 3/064* (2013.01); *G06F 3/0649* (2013.01); *G06F 3/0656* (2013.01); *G06F 3/0679* (2013.01); *G06F 16/164* (2019.01);
(Continued)

(58) Field of Classification Search
CPC ............. G06F 16/1724; G06F 16/2272; G06F 16/2282; G06F 16/10; G06F 16/24552; G06F 12/023; G06F 12/1081; G06F 12/1009; G06F 12/0246; G06F 12/0866; G06F 12/084; G06F 12/0871; G06F 3/0658; G06F 3/0613; G06F 3/0659; G06F 3/064; G06F 3/0649; G06F 3/0656; G06F 3/0608; G06F 3/0619; G06F 3/0679;
(Continued)

(56) References Cited

U.S. PATENT DOCUMENTS 7,484,071 B2 * 1/2009 Serizawa ............... G06F 3/0631
711/170
8,909,887 B1 * 12/2014 Armangau ............. G06F 3/061
707/693

(Continued)

FOREIGN PATENT DOCUMENTS

WO WO2008039527 A2 * 4/2008
WO WO2013130109 A1 * 9/2013
WO WO2015119786 A1 * 8/2015

OTHER PUBLICATIONS

Wenjie Qi et al., "InDeF: An Advanced Defragmenter Supporting Migration Offloading on ZNS SSD", IEEE 40th International Conference on Computer Design (ICCD), Oct. 2022, (pp. 307-314).*

(Continued)

*Primary Examiner* — Srirama Channavajjala
(74) *Attorney, Agent, or Firm* — Brooks, Cameron & Huebsch, PLLC

(57) ABSTRACT

Apparatuses, systems, and methods for using defrag levels to reduce data loss are provided herein. In a number of embodiments of the present disclosure, a method can include setting a first defrag level for a memory device, determining if a buffer is full while performing defrag operations on the memory device according to the first defrag level, setting a second defrag level for the memory device in response to determining the buffer is full while performing defrag operations according to the first defrag level.

20 Claims, 5 Drawing Sheets

(51) Int. Cl.
 G06F 3/06 (2006.01)
 G06F 16/16 (2019.01)
 G06F 16/17 (2019.01)
 G06F 16/172 (2019.01)
 G06F 16/174 (2019.01)

(52) U.S. Cl.
 CPC ........ G06F 16/172 (2019.01); G06F 16/1727 (2019.01); G06F 16/174 (2019.01)

(58) Field of Classification Search
 CPC .. G06F 16/1727; G06F 16/174; G06F 16/172; G06F 16/164; G06F 16/137; G06F 16/152
 See application file for complete search history.

(56) References Cited

U.S. PATENT DOCUMENTS

| | | | | |
|---|---|---|---|---|
| 2006/0095707 A1* | 5/2006 | Hu | ........................ | G06F 12/023 711/171 |
| 2009/0300318 A1* | 12/2009 | Allen | .................. | G06F 12/0246 711/206 |
| 2009/0327582 A1* | 12/2009 | Chartrand | ........... | G06F 12/0246 711/E12.001 |
| 2010/0011323 A1* | 1/2010 | Peterson | ............... | G06F 3/0676 715/847 |
| 2011/0099326 A1* | 4/2011 | Jung | .................... | G06F 3/0679 711/E12.001 |
| 2012/0110288 A1* | 5/2012 | Lehr | .................... | G06F 12/023 711/170 |
| 2014/0095767 A1* | 4/2014 | Trika | .................... | G06F 3/0652 711/E12.008 |
| 2014/0223083 A1* | 8/2014 | Park | .................... | G06F 12/0246 711/103 |
| 2019/0138499 A1* | 5/2019 | Dryfoos | ................ | G06F 16/215 |
| 2019/0324683 A1* | 10/2019 | Li | ........................... | G06F 3/064 |
| 2022/0043747 A1* | 2/2022 | Palmer | ................ | G06F 3/0604 |
| 2022/0210521 A1 | 6/2022 | Peter et al. | | |
| 2022/0261170 A1 | 8/2022 | Vohra et al. | | |
| 2022/0261286 A1 | 8/2022 | Wang et al. | | |
| 2022/0300413 A1 | 9/2022 | Kannan et al. | | |

OTHER PUBLICATIONS

Saswati Sarkar et al., "A parallel technique for storage defragmentation in cloud", Second International Conference on Research in Computational Intelligence and Communication Networks (ICRCICN), Sep. 2016, pp. 153-156.*

* cited by examiner

DEFRAG LEVELS TO REDUCE DATA LOSS

TECHNICAL FIELD

The present disclosure relates generally to memory devices, and more particularly, to apparatuses, methods, and systems for using defrag levels to reduce data loss.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others. Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
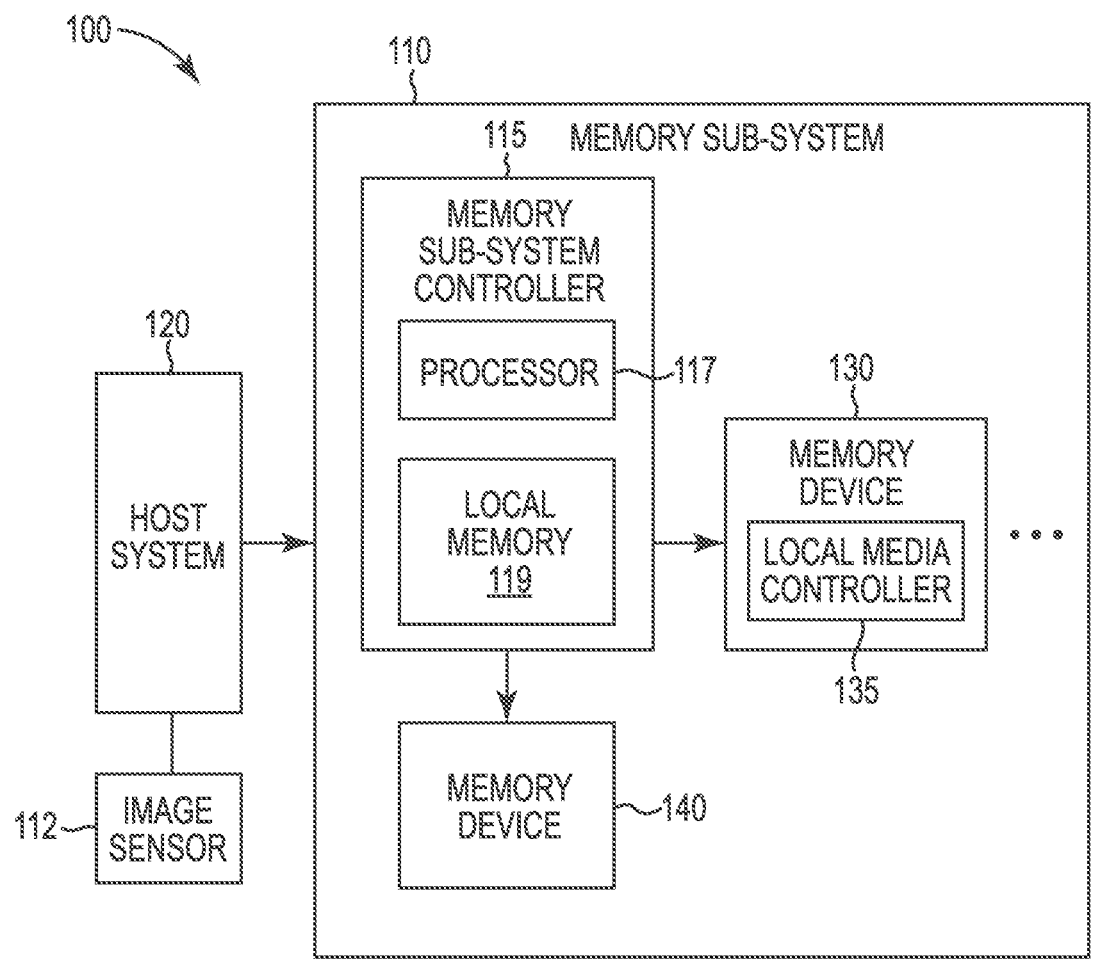
FIG. 1 illustrates an example computing system that includes a memory sub-system in accordance with some embodiments of the present disclosure.

Apparatuses, systems, and methods for using defrag levels to reduce data loss are provided herein. In a number of embodiments of the present disclosure, a method can include setting a first defrag level for a memory device, determining if a buffer is full while performing defrag operations on the memory device according to the first defrag level, setting a second defrag level for the memory device in response to determining the buffer is full while performing defrag operations according to the first defrag level.

A memory system can store data (e.g., video data) captured by an image sensor. The memory system can receive the data, store the data in a buffer, and transfer the data from the buffer to a memory device. If the buffer is receiving data at a rate that is greater than a rate that the data is transferred from the buffer and written to the memory device, data loss can occur. Data loss can be caused by latency in writing the data in the memory device. In an example where the data is video data, data loss can result in frame drop where frames of video are missing from the video data stored in the memory device.

The memory device can perform defrag operations, which can be background operations where the memory device is refreshing data by folding data from SLC data to MLC data and/or performing garbage collection, among other background operations where the memory device is performing operations on data that is stored in the memory device and not writing user data to the memory device. A memory device is busy while performing defrag operations and is not writing user data to the memory device.

In a number of embodiments, defrag levels can be used by the memory device to control the performance of the memory device. For example, the memory device can use three defrag levels. A first defrag level can perform defrag operations on 4 portions of data after writing 12 portions of user data to the memory device and so on. A second defrag level can perform defrag operations on 2 portions of data after writing 6 portions of user data to the memory device and so on. A third defrag level can perform defrag operations on 1 portion of data after writing 3 portions of user data to the memory device and so on.

The defrag levels can affect the performance of the memory device, where defrag levels that perform defrag operations on more portions of data before resuming writing new user data decreases the write performance of the memory device by having longer periods of time where the memory device is busy and unable to write new user data to the memory device. For example, a first defrag level that performs defrag operations on four portions of data before resuming writing user data has a lower write performance than the second defrag level that performs defrag operations on 2 portions of data before resuming writing user data. Setting a defrag level that has better write performance can help to reduce data loss in a memory device by allowing the memory device to write data a rate that allows the buffer to remain at least partially empty.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more of such things. For example, a number of dampers can refer to one or more dampers. Additionally, designators such as "V", "W", "X", "Y", and "Z", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example computing system 100 that includes a memory sub-system 110 in accordance with some embodiments of the present disclosure. Aspects of the present disclosure are directed to memory sub-system 110 using defrag levels to reduce data loss, in particular to memory sub-systems 110 that include a storage device, a memory module, or a combination of such. An example of a memory sub-system 110 is a storage system such as a solid-state drive (SSD). Examples of storage devices and memory modules are described below in conjunction with FIG. 1.

In general, a host system (e.g., host) 120 can utilize a memory sub-system 110 that includes one or more components, such as memory devices 130 that store data. The host system 120 can provide data to be stored at the memory sub-system 110 and can request data to be retrieved from the memory sub-system 110.

A memory device 130 can be a non-volatile memory device. One example of non-volatile memory device is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device 130 used to store data and can include a group of memory cells, a word line group, a word line, or individual memory cells. For some memory devices 130, blocks (also hereinafter referred to as "memory blocks") are the smallest area that can be erased. Pages cannot be erased individually, and only whole blocks can be erased.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Each of the memory devices 140, 130 can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The computing system 100 can include an image sensor 112 coupled to host system 120. The image sensor 112 can also be located on host system 120. Image sensor 112 can generate data (e.g., video data) for storage on the memory system 110. The host system 120 can process the data (e.g., compress the data) generated by image sensor 120 and the host system can send the data generated by image sensor 120 to memory system 110 for storage. The host system 120 can include a processor, such as a graphics processing unit (GPU), for processing the data generated by image sensor.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface.

The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 140, 130 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 140, 130 to perform operations such as reading data, writing data, or erasing data at the memory devices 140, 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 140, 130. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local memory controller 135) for media management within the same memory device package. An example of a managed memory device is a managed NAND (MNAND) device.

Figure 2:
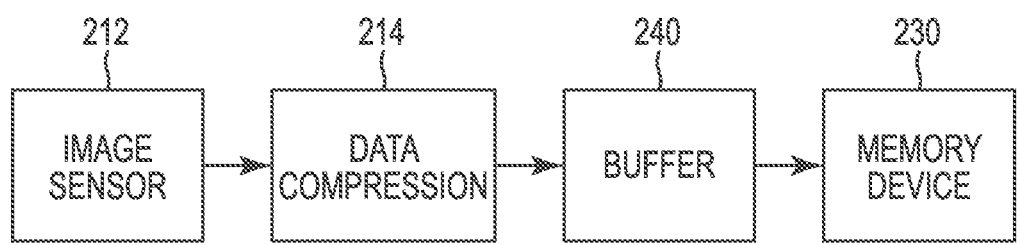
FIG. 2 is a block diagram of a computing system configured to capture and store video data in accordance with a number of embodiments of the present disclosure.

FIG. 2 is a block diagram of a computing system configured to capture and store video data in accordance with a number of embodiments of the present disclosure. Image sensor 212 can generate image data in form of photographs or video data. Image sensor 212 can compress the data 214 or send the image data to a processor, such as a GPU, for data compression 214. The data can then be sent to a memory system for storage. The memory system can include a buffer 240 to temporarily store the data before storing the data on memory device 230. The buffer 240 can include volatile memory to temporarily store the data to reduce data loss due to a difference in the rate that the image sensor is generating data and sending data to the memory system and the rate at which the memory device 230 is writing the data.

The memory system can use a number of defrag levels to affect the performance of the memory device. The defrag levels can include performing defrag operations portions of data before resuming writing new user data. Defrag levels can decrease the write performance of the memory device by having longer periods of time where the memory device is busy performing defrag operations and unable to write new user data to the memory device. For example, a first defrag level that performs defrag operations on four portions of data before resuming writing user data has a lower write performance than the second defrag level that performs defrag operations on 2 portions of data before resuming writing user data. Setting a defrag level that has better write performance can help to reduce data loss in a memory device by allowing the memory device to write data a rate that allows the buffer to remain at least partially empty.

Figure 3:
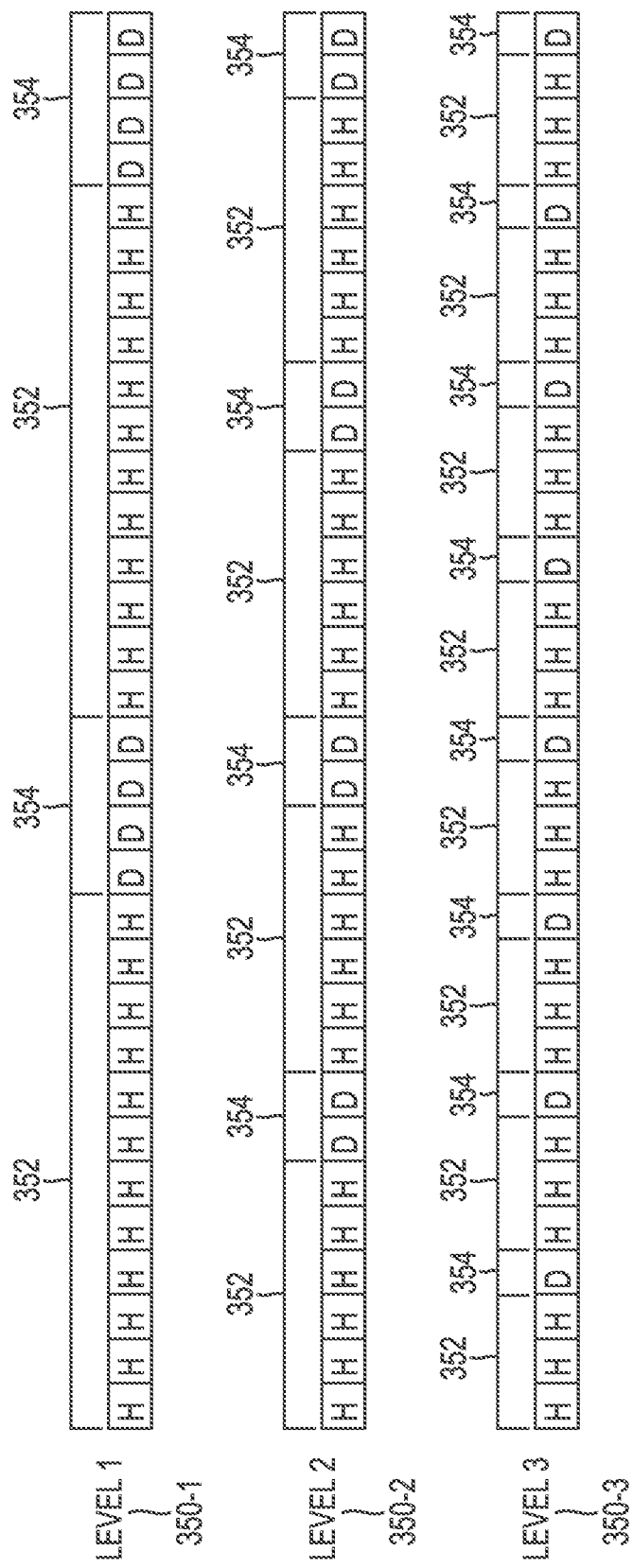
FIG. 3 illustrates a number of defrag levels in accordance with a number of embodiments of the present disclosure.

FIG. 3 illustrates a number of defrag levels in accordance with a number of embodiments of the present disclosure. In FIG. 3, a first defrag level 350-1, a second defrag level 350-2, and a third defrag level 350-3 are illustrated. The defrag levels can include writing portions of data from the image sensor 352 and followed by writing portion of data as part of defrag operations 354. In FIG. 3, first defrag level 350-1 can include writing 12 portions of data from the image sensor 352 and followed by writing 4 portion of data as part of defrag operations 354. Second defrag level 350-2 can include writing 6 portions of data from the image sensor 352 and followed by writing 2 portion of data as part of defrag operations 354. Third defrag level 350-3 can include writing 3 portions of data from the image sensor 352 and followed by writing 1 portion of data as part of defrag operations 354.

Figure 4:
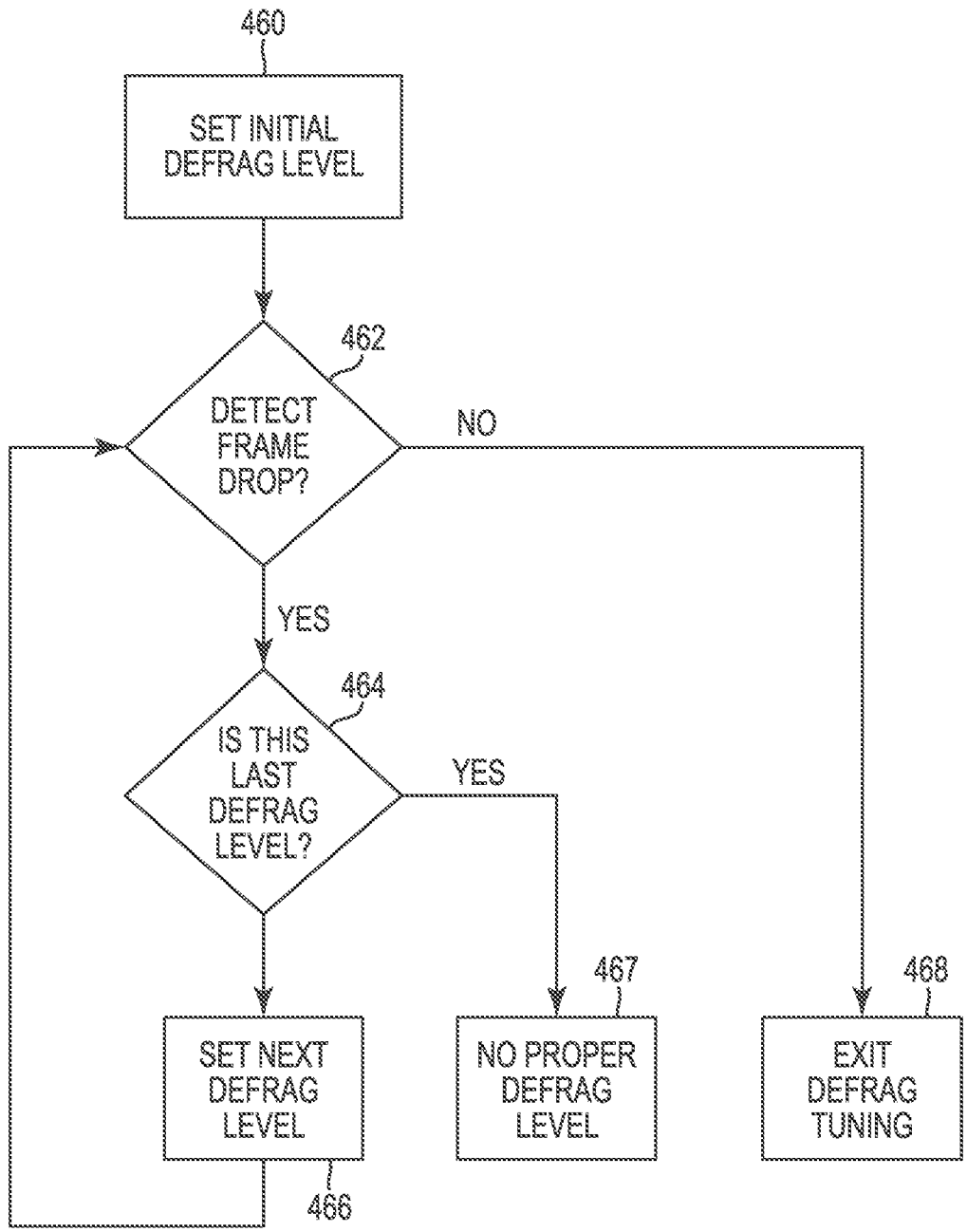
FIG. 4 is a flow diagram of a method for determining defrag level usage in accordance with a number of embodiments of the present disclosure.

FIG. 4 is a flow diagram of a method for tuning defrag level usage in accordance with a number of embodiments of the present disclosure. The method in FIG. 4 can include setting an initial defrag level 460. In a number of embodiments, the initial defrag level can be set to a level with the lowest write performance while also having the lowest write amplification.

The method can include detecting frame drop 462. Frame drop can occur when the memory system is storing video data and the buffer is receiving data at rate that is greater than a rate at which the memory device is writing the data received from the buffer. If frame drop is not detected, then the method includes exiting the defrag tuning process 468. If frame drop is detected, the method determines if the last defrag level is being used 464. If the last defrag level is being used, then there is no proper defrag level 467 and the memory system is not able avoid frame drop based on the rate that the image sensor is sending data to the memory system. If the last defrag level is not being used, the next defrag level is set 466 and the method returns to 452 to detect if there is frame drop while using the next defrag level.

Figure 5:
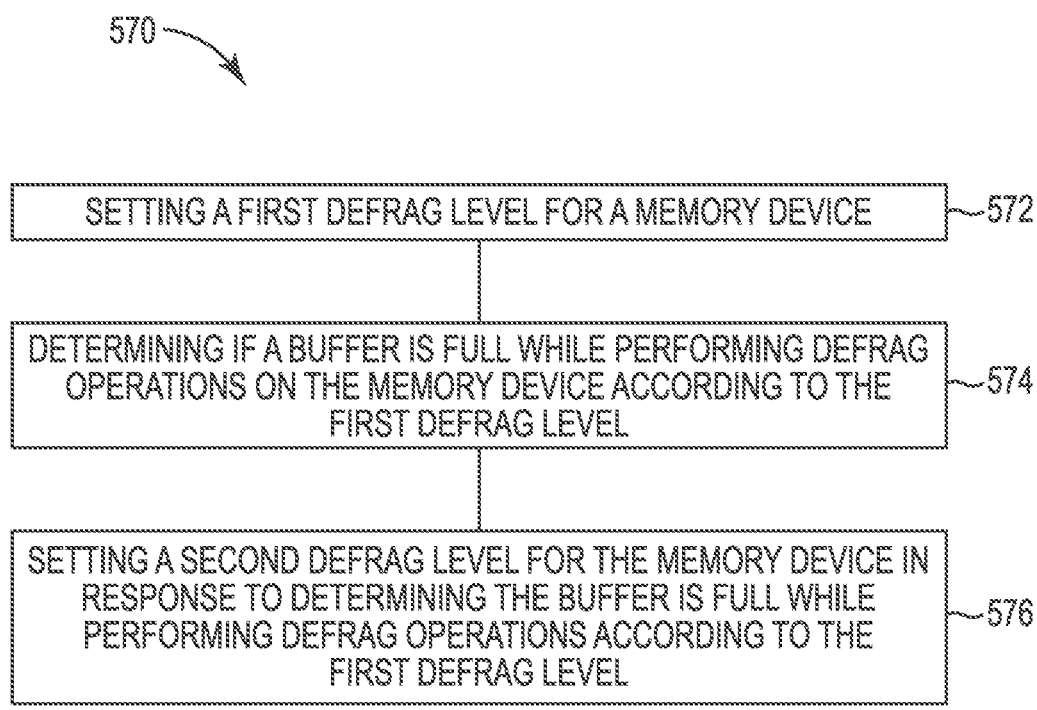
FIG. 5 is a flow diagram of a method for using a number of defrag levels in accordance with a number of embodiments of the present disclosure.

FIG. 5 is a flow diagram of a method 570 for using a number of defrag levels in accordance with a number of embodiments of the present disclosure. At 572, the method 570 can include setting a first defrag level for a memory device. The first defrag level can be a level that includes the lowest write performance (e.g., the greatest quantity of defrag operations performed consecutively).

At 574, the method 570 can include determining if a buffer is full while performing defrag operations on the memory device according to the first defrag level.

At 576, the method 570 can include setting a second defrag level for the memory device in response to determining the buffer is full while performing defrag operations according to the first defrag level. The second defrag level can be a level that increases the write performance of the memory device when compared to the first defrag level (e.g., the quantity of defrag operations performed consecutively with the second defrag level is less than the quantity of defrag operations performed consecutively with the first defrag level).

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
 a first memory device;
 a second memory device, wherein the second memory device is a buffer; and
 a controller, coupled to the first memory device and the second memory device, configured to:
  receive and write data to the second memory device at a first rate;
  set a first defrag level for the first memory device, wherein the first defrag level is associated with transferring data from the second memory device to the first memory device and performing defrag operations on the first memory device at a second rate;
  transfer a first portion of the data from the second memory device to the first memory device and performing a first number of defrag operations on the first memory device at the second rate based on the first defrag level;
  set a second defrag level for the first memory device in response to a determination that the second memory device is full due to writing the data to the second memory device at the first rate while writing the first portion of the data to the first memory device and performing the first number of defrag operations on the first memory device at the second rate according to the first defrag level such that the first rate is greater than the second rate, wherein the second defrag level is associated with transferring data from the second memory device to the first memory device and performing defrag operations on the first memory device at a third rate; and transfer a second portion of the data from the second memory device to the first memory device and perform a second number of defrag operations on the first memory device at the third rate based on the second defrag level, wherein an amount of time that the first memory device is performing the second number of defrag operations on the first memory device is less than an amount of time that the first memory device is performing the first number of defrag operations on the first memory device.

2. The apparatus of claim 1, wherein the controller is configured to determine if the second memory device is full due to writing the data to the second memory device at the first rate while transferring the second portion of the data to the first memory device and performing the second number of defrag operations on the first memory device at the third rate according to the second defrag level.

3. The apparatus of claim 2, wherein the controller is configured to set a third defrag level for the first memory device in response to determining the second memory device is full due to writing the data to the second memory device at the first rate while transferring the second portion of the data to the first memory device and performing the second number of defrag operations on the first memory device at the third rate according to the second defrag level such that the first rate is greater than the third rate, wherein the third defrag level is associated with transferring data from the second memory device to the first memory device and performing defrag operations on the first memory device at a fourth rate.

4. The apparatus of claim 3, wherein the controller is configured to determine if the second memory device is full due to writing the data to the second memory device at the first rate while transferring a third portion of the data to the first memory device and performing a third number of defrag operations on the first memory device at the fourth rate according to the third defrag level.

5. The apparatus of claim 4, wherein the controller is configured to cause the first memory device to exit a defrag mode for the first memory device where the first memory device discontinues performing defrag operations in response to determining the second memory device is full due to writing the data to the second memory device at the first rate while performing the third number of defrag operations on the first memory device at the fourth rate according to the third defrag level such that the first rate is greater than the fourth rate.

6. The apparatus of claim 1, wherein the second memory device is a buffer for the first memory device and the second memory device is receiving and storing video data from an image sensor coupled to the apparatus.

7. The apparatus of claim 1, wherein defrag operations are background operations that move data between blocks in the first memory device.

8. A method, comprising:
receiving and writing data to a buffer at a first rate;
setting a first defrag level for a memory device, wherein the first defrag level is associated with transferring data from the buffer to the memory device and performing defrag operations on the memory device at a second rate;

transferring a first portion of the data from the buffer to the memory device and performing a first number of defrag operations on the memory device at the second rate based on the first defrag level;

setting a second defrag level for the memory device in response to determining that the buffer is full due to writing the data to the buffer at the first rate while writing the first portion of the data to the memory device and performing the first number of defrag operations on the memory device at the second rate according to the first defrag level such that the first rate is greater than the second rate, wherein the second defrag level is associated with transferring data from the buffer to the memory device and performing defrag operations on the memory device at a third rate; and transferring a second portion of the data from the second memory device to the first memory device and performing a second number of defrag operations on the first memory device at the third rate based on the second defrag level, wherein an amount of time that the first memory device is performing the second number of defrag operations on the first memory device is less than an amount of time that the first memory device is performing the first number of defrag operations on the first memory device.

9. The method of claim 8, further comprising determining if the buffer is full due to writing the data to the buffer at the first rate while transferring the second portion of the data to the memory device and performing the second number of defrag operations on the memory device at the third rate according to the second defrag level.

10. The method of claim 9, further comprising setting a third defrag level for the memory device in response to determining the buffer is full due to writing the data to the buffer at the first rate while transferring the second portion of the data to the memory device and performing the second number of defrag operations at the third rate according to the second defrag level such that the first rate is greater than the third rate, wherein the third defrag level is associated with transferring data from the buffer to the memory device and performing defrag operations on the memory device at a fourth rate.

11. The method of claim 10, further comprising determining if the buffer is full due to writing the data to the buffer at the first rate while transferring a third portion of the data to the memory device and performing a third number of defrag operations at the fourth rate according to the third defrag level.

12. The method of claim 11, further comprising exiting a defrag mode for the memory device where the memory device discontinues performing defrag operations.

13. The method of claim 8, wherein performing defrag operations according to the first defrag level includes performing defrag operations after the memory device has written data to a first number of blocks on the memory device since a previous defrag operation.

14. The method of claim 13, wherein performing defrag operations according to the second defrag level includes performing defrag operations after the memory device has written data to a second number of blocks on the memory device since the previous defrag operation.

15. The method of claim 14, wherein the first number of blocks is greater than the second number of blocks.

16. An apparatus, comprising:
a first memory device;
a second memory device; and
a controller, coupled to the first memory device and the second memory device, configured to:
set a defrag level for the first memory device with a defrag level command,
  wherein the defrag level indicates when the first memory device will perform a defrag operation and how much data to move in a defrag operation, and
  wherein the defrag level is set based on an amount of data in the second memory device;
receive and write data to the second memory device at a first rate;
transfer a first portion of the data from the second memory device to the first memory device and perform a first number of defrag operations on the first memory device at a second rate based on the first defrag level; and
determine if the second memory device is full due to writing the data to the second memory device at the first rate while transferring the first portion of the data to the first memory device and performing the first number of defrag operations on the first memory device at the second rate according to the first defrag level, wherein the second memory device will be full if the first rate is greater than the second rate and the second memory device will be at least partially empty if the first rate is less than the second rate.

17. The apparatus of claim 16, wherein the second memory device is a buffer for the first memory device and the second memory device receives and stores video data from a camera coupled to the apparatus.

18. The apparatus of claim 17, wherein frame drop of the video data occurs in the first memory device when the second memory device is full.

19. The apparatus of claim 16, wherein the defrag level performs a defrag operation after the first memory device has written data to a first number of blocks on the memory device since a previous defrag operation.

20. The apparatus of claim 16, wherein the defrag level performs a defrag operation after the first memory device has written data to a second number of blocks on the memory device since a previous defrag operation.

* * * * *